United States Patent [19]

Kucheria et al.

[11] 4,363,199
[45] Dec. 14, 1982

[54] FIRE RESISTANT SEALING SYSTEM FOR HOLES IN FIRE RESISTANT BUILDING PARTITIONS

[75] Inventors: Chhattar S. Kucheria; Russell D. Smith, both of Grand Island, N.Y.

[73] Assignee: Kennecott Corporation, Stamford, Conn.

[21] Appl. No.: 146,826

[22] Filed: May 5, 1980

[51] Int. Cl.³ .............................................. E04B 5/48
[52] U.S. Cl. ........................................ 52/221; 52/744
[58] Field of Search ........................ 52/221, 743, 744; 277/12; 285/192

[56] References Cited

U.S. PATENT DOCUMENTS

| | | | |
|---|---|---|---|
| 3,012,923 | 12/1961 | Slayter . | |
| 3,560,253 | 2/1971 | Ashton . | |
| 3,769,072 | 10/1973 | Echerd | 428/920 X |
| 3,819,468 | 6/1974 | Sauder et al. | 52/270 X |
| 3,827,997 | 8/1974 | Bergomi, Jr. | 260/29.6 TA |
| 3,865,760 | 2/1975 | Pitts et al. | 260/2.5 AJ |
| 3,954,274 | 5/1976 | Grandlic | 521/88 X |
| 4,086,736 | 5/1975 | Landrigan | 285/192 X |
| 4,095,985 | 6/1978 | Brown | 106/77 X |
| 4,122,059 | 10/1978 | Hansen | 260/37 EP |
| 4,130,458 | 12/1978 | Moore et al. | 428/921 X |
| 4,169,185 | 9/1979 | Bhatia | 428/328 |
| 4,174,331 | 11/1979 | Myles | 260/29.1 R |

FOREIGN PATENT DOCUMENTS 2551693 6/1977 Fed. Rep. of Germany ........ 52/221

OTHER PUBLICATIONS

"Oral Disclosure" Seal 1, Prior Art Statement bridging pp. 4, 5.
Service Proposal of May 20, 1979.
Service Proposal of Feb. 16, 1979.
Product Sheet, Non-Flammable Sealer, Jun. 1978.

Primary Examiner—Alfred C. Perham
Attorney, Agent, or Firm—R. Lawrence Sahr; Paul A. Leipold

[57] ABSTRACT

There is disclosed a fire-resistant seal for sealing around a member passing through a fire-resistant building divider. The seal is formed of an adhesive fire-resistant cement on at least one side generally in the plane of the divider surface, behind the adhesive cement is placed bulk ceramic fiber. The second surface of the seal may be covered with an adhesive cement.

8 Claims, 3 Drawing Figures

U.S. Patent     Dec. 14, 1982     4,363,199
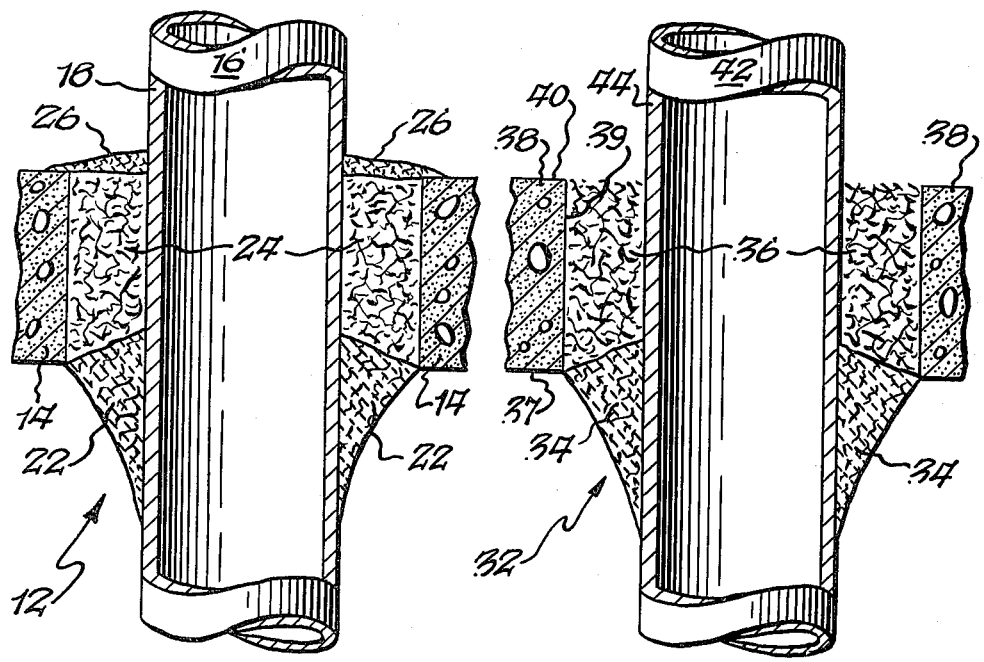
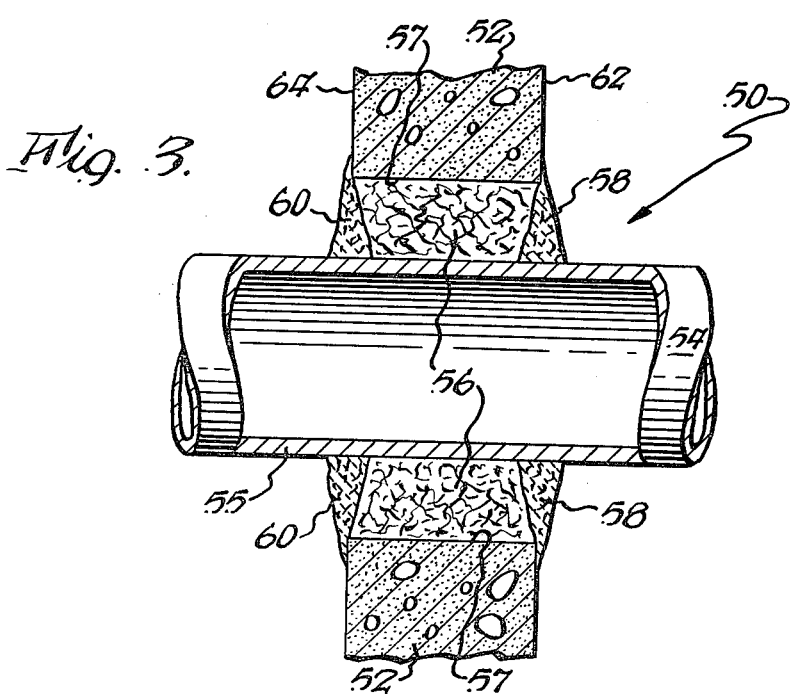

FIRE RESISTANT SEALING SYSTEM FOR HOLES IN FIRE RESISTANT BUILDING PARTITIONS

BACKGROUND OF THE INVENTION

1. Field of the Invention

This invention relates to the providing of fire resistant seals for building construction. It is particularly concerned with the sealing around pipes and other members passing through fire resistant walls and floors.

2. Prior Art

In the construction of residential and commercial buildings it is often necessary that pipes and other members such as electric cables, electric cable trays and telephone cable trays pass through walls, floors and ceilings. The holes for these members are necessarily somewhat larger than the members themselves. Therefore, in the event of fire, it is possible for flames, heat and smoke to pass around these pipes and other members thereby spreading damage and fire. The desirability of sealing around these openings is particularly important in the instance of fireproof walls. Without sealing around openings through these walls, the safety and fire protection which is their purpose is lessened.

It has been known to inject a silicone foam around pipes where they pass through fireproof partitions. However, this material is very expensive and further if utilized in a ceiling requires the sealing of the opening with something to prevent its running out prior to hardening. A method of sealing to prevent run-out is to press a fiberboard against the opening for several minutes until the material hardens. Another disadvantage of silicone foam even when combined with fibers is that it requires special equipment for mixing and must be used within about two minutes of formation or it will harden and not be usable.

Another method of attempting to seal where members pass through fiberproof partitions is to stuff fiberglass or ceramic fibers around the pipe in an attempt to prevent the passage of flames, smoke and gases. However, this is difficult as the material does not stick well in holes in ceilings and floors and is easily dislodged even when utilized in walls. The material further is not gas- or smoke-impermeable to a great extent.

Therefore, there is a continuing need for an improved method of sealing around pipes and other members which pass through partitions in buildings in order to improve their fire resistance.

BRIEF DESCRIPTION OF THE INVENTION

It is an object of this invention to overcome difficulties of prior practices.

It is another object of this invention to provide a seal around members passing through building partitions that is fire-resistant.

It is a further object of this invention to provide low-cost fire-resistant sealing around members passing through fire-resistant building dividers.

It is an additional object of this invention to provide a method of installing fire-resistant pipe seals in ceilings and floors.

It is another further object of this invention to provide an easy method of sealing around members which pass through partitions.

These and other objects of the invention are generally accomplished by providing a moldable non-flammable adhesive material of insulating and/or fire retarding material which is utilized to seal the opening between a pipe or other member passing through a building divider and the edge of the hole in the building divider through which the member passes. The moldable adhesive material is applied generally in the plane of one surface of the partition or building divider. Ceramic fiber is then placed into the interstices formed by the pipe, sealing material and inner surface of the hole. Adhesive sealing material then may be placed on the other surface of the seal over the ceramic fiber and generally in the other surface plane of the building divider partition.

In a particularly preferred form of the invention, the partition is a cement floor, wall or ceiling. The moldable adhesive material is a refractory moldable composition containing ceramic fiber finely divided colloidal silica and aluminum trihydrate. The moldable composition further contains an adhesion-enchancing agent to increase its adhesion to the pipe and partition. The method of the invention is particularly preferred for filling holes in ceilings where fire-resistance is particularly needed and particularly in holes through cement ceilings where there is sufficient partition thickness to insert an effective amount of ceramic fiber behind the refractory moldable composition utilized as the sealing means.

BRIEF DESCRIPTION OF THE DRAWINGS

FIG. 1 is a cross section of the sealing system of the invention where a pipe, partially in section, is passing through a hole in a concrete ceiling.

FIG. 2 is a partial cross section of a seal of the invention in a differing embodiment wherein the fire-resistant adhesive material is only used on the lower portion seal around the pipe as it passes through the ceiling.

FIG. 3 is an illustration in partial cross-section of a seal of the invention for a pipe passing through a wall.

DETAILED DESCRIPTION OF THE INVENTION

The system of the invention has numerous advantages which will become apparent from the detailed descriptions below. The seals of the invention are easy to apply without skilled labor or special machinery. Further, the system of the invention may be easily applied into holes in ceilings around pipes, electric cables or telephone cable trays. Another advantage is that the seal of the invention does not transmit a high degree of heat while it remains in place when exposed to a fire. Another additional advantage is that the sealing system is of low cost in both materials and labor. Further advantages of the system will become apparent from the description of the preferred embodiments below.

Illustrated in FIG. 1 is a sealing system of the invention generally indicated as 12 wherein a pipe 16 passes through a cement floor 14. The seal is composed of an adhesive molding compound material 22 which is first applied to the opening between the pipe 16 and floor 14. The refractory cement is a non-flammable adhesive material which will hold between the floor and the pipe until cured. Above the adhesive molding compound material 22 is placed a filling material of ceramic fibers 24 which provide insulation for the seal and substantial fire resistance in the event that the adhesive material is dislodged during a fire. On the upper side of the seal another layer of refractory adhesive cement material 26 is placed. The pipe 16 is illustrated as having a relatively thin wall 18. However, it is understood that within the invention the system of sealing could be around other members such as electrical cables, telephone cables or heating ducts.

In an alternative construction shown in FIG. 2 there is a seal generally indicated as 32. The seals 32 seals the interstice between pipe 42 passing through ceiling or floor 38. The pipe 42 has wall member 44 which with the edge 39 of the hole in the floor or ceiling creates the interstice which the fire resistant seal of the invention fills. The seal is formed by first placing fire resistant adhesive sealing molding compound material 34 into the lower part of the interstice between the pipe 42 and floor 38. The refractory cement 34 preferably does not require heating for curing and has adhesion sufficient to hold and seal between pipe and floor. On the upper portion of the adhesive molding cement 34 is placed or packed ceramic fiber 36 which provides heat and flame protection for the upper portion of 39 of the ceiling 37. It is of course true that in a multi-story builing the ceiling 37 may form the lower part of a floor 40 for the next story.

Illustrated in FIG. 3 is a fire-resistant sealing system generally indicated as 50 for sealing between a pipe 54 going through a vertical wall structure 52. The seal is formed by placing an adhesive refractory molding material 58 on one side approximately in the plane of the surface 62 of wall 52. The sealing material in the application for a vertical wall does not need to be as thick in order to hold it in place. Of course the thickness is dependent on the distance in the interstice between the pipe or other member passing through the wall and the surface 57 of the hole. Ceramic fiber material 56 is then placed into the interstice between the pipe surface 55 and the annular surface 57 of the hole through which the pipe passes.

The outer sealing material may be any moldable adhesive material easily applied that has insulating and/or fire retarding properties. The moldable adhesive material should also be non-flammable and easily formable. There are a variety of moldable adhesive materials which are generally comprised of ceramic fibers in combination with a non-flammable cement. The moldable adhesive materials may suitably contain inorganic binders such as colloidal silica and endothermic agents such as aluminum trihydrate. A suitable adhesive material is the moldable composition containing ceramic fiber and colloidal silica as disclosed in U.S. Pat. No. 4,174,331 to Myles. This composition comprises preferably between about 45 to about 65% liquid vehicle, about 20 to about 26% by weight of ceramic fiber, about 7 to about 30% by weight colloidal silica and an adhesion-enhancing agent consisting of solid acrylic polymer. An optimum adhesive sealing material is the moldable adhesive composition of U.S. Pat. No. 4,174,331 modified by the addition of aluminum trihydrate which enhances the fire-resistant properties. Another molding compound is Uniseal which is a product of Uniseal, Inc. and comprises 50% inorganic filler and about 50% organic material, primarily a green mastic. The preferred compositions in addition to having high adhesive properties sufficient to span the open area between a pipe and the hole surrounding it are fire-resistant. The addition of the material such as aluminum trihydrate enhances their already considerable fire-resistant properties.

The filler material of bulk fiber forming the central portion of the sealing system of the invention may be a bulk ceramic fiber predominantly comprised of alumina silica formed from a known process such as in U.S. Pat. Nos. 2,557,834 and 2,710,261 to McMullen and commonly referred to as ceramic fiber. It also may be a high alumina microcrystalline fiber such as disclosed in U.S. Pat. No. 3,996,145 to Hepburn and U.S. Pat. No. 4,159,205 to Miyahara, or for a lower cost less efficient seal, mineral wool or insulating castable material. The preferred material is the ceramic fiber formed of alumina silicate such as Fiberfrax ® from The Carborundum Company. This material is preferred as it is low in cost and stable up to at least about 2300° F.

While the material has been illustrated for sealing around a pipe passing through a fireproof partition, the system of the invention also could be utilized to seal around other members passing through structural walls. Other members which may utilize the seal of the instant invention are the devices such as cable trays for electric and telephone cables, heating and cooling ducts and both water supply and waste water piping.

The following examples serve to illustrate the invention. Parts are by weight and temperatures in Fahrenheit unless otherwise indicated.

EXAMPLE

The following Example is an illustration of the testing of three seals in accordance with the invention. The test is performed simultaneously on all three seals. A concrete floor of nominal six-inch thick reinforced concrete slab is provided with three 11-inch diameter holes penetrating through it. The floor size was 7' by 7'. Steel pipes six inches in diameter of standard weight schedule 40 were placed in the center of each penetration in the concrete floor and supported from above. Fire resistant seal number 1 was formed of Uniseal fire-retardant calk of about $\frac{1}{2}$ inch nominal thickness used as the sealing material on the bottom of the penetration. The upper portion above the fire-retardant calk was filled with Carborundum's Variform A ceramic fiber to a $5\frac{1}{2}$ inch thickness and a nominal density of 57.6 pounds per cubic foot. The actual weight of Variform A used was 14.4 pounds. Fire resistant seal number 2 was formed with Uniseal fire-retardant calk of $\frac{1}{2}$ inch nominal thickness used as the bottom sealing material and also has Uniseal on the top of the hole or penetration. Carborundum Fiberfrax ® bulk ceramic fibers with 6.4 pounds per cubic foot nominal density filled the seal. 1.6 pounds of Fiberfrax ® bulk fibers were used. For fire-resistant seal number 3 a $\frac{1}{2}$ inch nominal thickness of modified LDS moldable of a composition 20% aluminum trihydrate, 39% water, 17% Fiberfrax ® bulk fibers, 23.6% fine colloidal silica and 0.3% solid acrylic polymer prepared from acrylamide was used as the bottom sealing material. 1.6 pounds of Carborundum Fiberfrax ® bulk ceramic fiber filled the hole and about a $\frac{1}{2}$ inch of modified LDS moldable of the same composition as the lower seal was used as the top seal. A total of 6.5 pounds of modified LDS moldable were used on the bottom and top of this penetration.

The test unit was subjected to fire exposure on the underside which followed the standard furnace temperature curve of ASTM 119-78.

The test results were taken after fire exposure for three hours, 5 minutes in accordance with ASTM 119-78 standard time temperature curve. The fire did not propogate to the unexposed side of the penetration seals. The temperatures of the unexposed surface of the penetration seals did not exceed 325° F. above ambient temperature of 75° F. The following temperatures were recorded on the unexposed surface of the seals after 3 hours of fire exposure: Seal No. 1, 167° F.; Seal No. 2, 182° F. and Seal No. 3, 179° F. after the three hours of exposure. This illustrates the superior performance of the seals.

While the invention has been described with reference to certain preferred embodiments, it would be clear to people skilled in the art that there are other variations of the sealing system of the invention which would be obvious and are intended to be included by the specification and the claims attached hereto. For instance, the illustration has been with cement walls and partitions. However, the system of the invention also could be utilized with other fire-resistant walls such as combinations of steel and fire-resistant filling material or cement block and cinder block. Further the seals could be used on walls of less fire-resistant materials. Further, while the illustration has been with the adhesive-sealing material being applied to seal the opening without need for molding devices, in the instance of extermely large interstices between the pipe and the edge of the hole in the wall, it might be necessary to provide support for the sealing material until it had an opportunity to harden. Such support could be provided by holding a board against the opening until curing.

In another variation of the invention other endothermic materials than aluminum trihydrate may be used in the invention. The adhesive molding compound used in the system of the invention may contain any endothermic material. Typical of suitable endothermic compounds are borate containing compounds i.e., boric acid; phosphate containing compounds; ammonium containing compounds i.e., hydrated ammonium phosphate; antimony compounds and chlorinated fluorinated or bromated endothermic compounds. The preferred endothermic material is aluminum trihydrate because it is low in cost, non-toxic and has good endothermic properties.

Although the foregoing describes presently preferred embodiments of the instant invention, it is understood that the invention may be practiced in still other forms within the scope of the following claims. For instance, while the seal application has been described entirely as performed by hand, it would be possible that various dispensing devices for adhesive fire-resistant materials and bulk fiber insulation could be utilized in the forming steps. Also, the hole could be any shape and these could be more than one member passing through the hole.

We claim:

1. A fire-resistant seal at least partially surrounding a member passing through a fireproof building dividing structure comprising an adhesive fire-resistant molding compound, said molding compound comprising an aluminum trihydrate endothermic material, ceramic fiber and colloidal silica, spanning the opening between said member and said dividing structure at about the plane of at least one surface of said structure and ceramic fiber filling the interstices between said member and said dividing structure.

2. The seal of claim 1 wherein said dividing structure is a cement wall, ceiling or floor.

3. The seal of claim 1 wherein said fire-resistant molding compound further comprises a solid acrylic polymer adhesion enhancing agent.

4. The seal of claim 1 wherein said member is a pipe.

5. A method of forming a fire-resistant seal at least partially surrounding a member passing through a fireproof building dividing structure comprising applying a fire-resistant adhesive cement, said cement comprising an aluminum trihydrate endothermic material, ceramic fiber and colloidal silica, to span the opening between said member and the first surface of said building dividing structure and inserting bulk ceramic fiber into the opening forming the interstice between the pipe and the inner surface of the hole in the dividing structure through which the member passes.

6. The method of claim 5 wherein the method further comprises covering the ceramic fiber insulating material with a second fire-resistant cement seal, said second cement seal comprising an endothermic material, that is generally in the plane of the second surface of the dividing structure.

7. The method of claim 5 wherein said adhesive cement further comprises a solid acrylic polymer adhesive-enhancing agent.

8. The method of claim 6, wherein said second cement comprises ceramic fiber, colloidal silica, a solid acrylic polymer and alumina trihydrate.

* * * * *